Patented Nov. 19, 1935

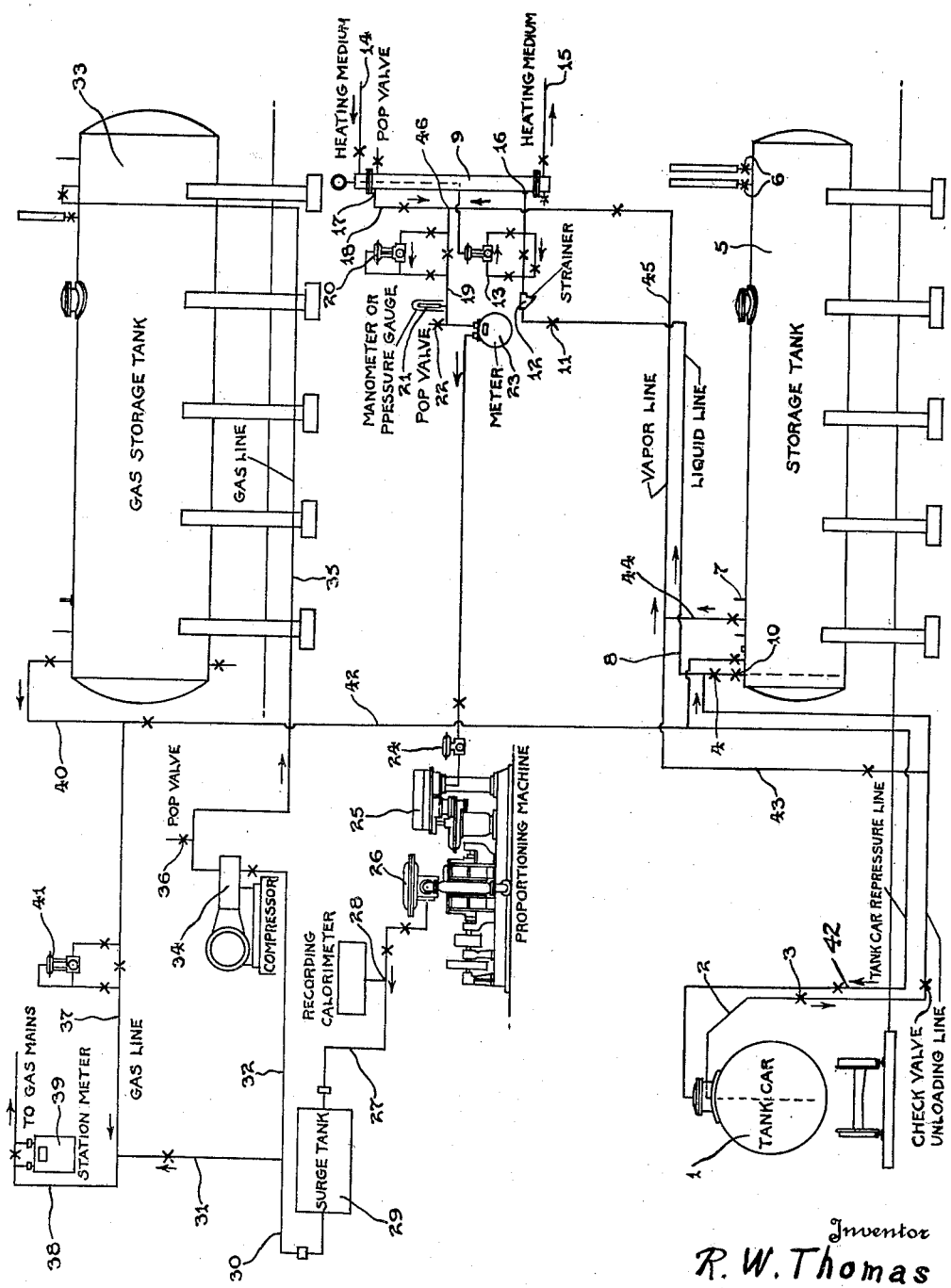

2,021,271

UNITED STATES PATENT OFFICE 2,021,271

APPARATUS FOR THE PRODUCTION OF GASEOUS MIXTURES

Rosswell W. Thomas, Detroit, Mich., assignor to Phillips Petroleum Company, Bartlesville, Okla., a corporation of Delaware Application February 18, 1930, Serial No. 429,317

4 Claims. (Cl. 48—180)

This invention relates to an improved process and apparatus for manufacturing gas for use in small towns or the like.

The large initial installation investment and the high gas manufacturing cost of gas plants of the conventional types for small properties, are such that from an economic point of view, such plants are not attractive. Even with high gas rates, the majority of small properties do not show a reasonable investment return. That the utility companies have not entered this field more fully is shown by the fact that at the beginning of 1929, there were over two hundred cities in the United States having in excess of five thousand people which are not supplied with gas.

It thus appears that there is a definite demand for a gas manufacturing process, which, with a low cost of installation and operation, will make it economically feasible to supply gas service to a majority of these communities.

Normally gaseous hydrocarbons, such as are present in natural gas, offer very interesting possibilities, as the sole raw materials in the manufacture of gas, particularly in locations that do not demand a supply in excess of 200,000 cubic feet of gas per day.

The hydrocarbon fuel most available, plentiful and economical to purchase, transfer, store and use, is commercial butane. It has been found from the use of charts dealing with the vapor pressure-temperature relations for various paraffin hydrocarbons, the properties of liquid commercial butane are such that at prevailing temperatures, its vapor pressures are not excessive, thereby facilitating the handling and the storage of the same, as a liquid, while at the same time, the vapor pressures are sufficiently high to insure against the condensation of the commercial butane component in the finished gas, even at low temperatures and high pressures.

By means of a dew point curve for mixtures of commercial butane and non-condensible gases, it is possible to determine the condensation temperatures and pressures of mixed gases of varying composition. For example, it can be found by such a curve what the maximum per cent of commercial butane in a mixed gas at 125 lbs. gauge, and 10° Fahrenheit, before condensation occurs. The percentage will be about 7.5 in this instance. On the other hand, by such a curve, it is also possible to find the condensation point of a mixture having 17.5% of commercial butane at 20 lbs. gauge pressure, and the dew point in this instance will be approximately —14° F.

By such a curve, it is also feasible to ascertain the gallons of commercial butane per thousand cubic feet, equivalent to a known volume percentage of commercial butane, and to read from the curve, the gallons per thousand direct.

Like procedure may be followed in determining the calorific value corresponding to a certain commercial butane per cent in the finished gas.

It has been found by experimentation and test, that one gallon of commercial butane will vaporize to produce about 32 cubic feet of gas of 3200 B. t. u. per cubic foot calorific value, and it is obvious that for distribution and use, this gas may be diluted to reduce its heat content to a point near the average already in use by the industry, and to which the appliances are built and adapted. The calorific value will be assumed as 550 B. t. u.'s per cubic foot in exemplifying the present invention.

The commercial butane vapor can be diluted with any one of a large number of other gases, some having lower calorific values, such as blue water gas, and producer gas, and others having no heating value, such as flue gases or air. The latter is universally available, and its use offers a large number of distinct advantages. Furthermore, accurate and automatic proportioning machines are on the market, and may be used to mix commercial butane vapor with air, giving a resultant mixture of extremely uniform calorific value and constant specific gravity.

It is interesting to note that the behavior of commercial butane coincides with that predicted by calculations from its physical properties. This fact is borne out by the close checks between calculations and actual test results, both laboratory and commercial, with respect to dew points, calorific values, specific gravities, vapor pressures, etc.

It has been found that 17.2% of commercial butane vapor (5.37 gallons per M) in air, gives a mixed gas of 550 B. t. u. At 50 lbs. gauge pressure, the dew point is about +11° F., above which temperature there is no condensation of the commercial butanes. At lower pressures, the dew point is less, and consequently, there is no danger of condensation at the temperatures and pressures encountered in standard gas plant or distribution practice.

If any other gas than air is used as the base gas or diluting agent, by substituting the proper values, the resulting specific gravity and calorific value can be readily calculated.

According to the most recent and the most authentic treatise on the subject, (U. S. Bureau of Mines Bulletin No. 279, "Limits of inflammability of gases and vapors", by H. F. Coward and G. W. Jones), the lower inflammability limit by volumes of butane in a mixture of butane and air, is 1.9%, and the higher limit is 8.5%. Since the percentage of commercial butane in a 550 B. t. u. air gas mixture is 17.2, it would be necessary to increase the amount of air to twice that of the mixed gas as normally made and distributed, before reaching the upper inflammability limit.

Commercial butane contains a small amount of propane at one end, and an insignificant amount of pentane at the other end. These two tend to compensate each other, so that for the purpose of calculations, we can assume that it is 100% $C_4H_{10}$. The theoretical amount of air required for complete combustion is then calculated from the equation:

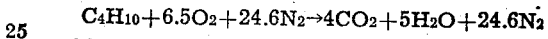

$$C_4H_{10}+6.5O_2+24.6N_2 \rightarrow 4CO_2+5H_2O+24.6N_2$$

6.5 volumes of $O_2$, are, therefore, required to combine with one volume of commercial butane, or $6.5 \times 4.7824 = 31.085$ volumes of air, so that the percentage composition of a mixture that will give complete combustion is:

|  | Percent |
|---|---|
| Commercial butane | 3.117 |
| Oxygen } air { | 20.258 |
| Nitrogen } air { | 76.625 |

Such a mixture has a specific gravity of 1.029, and a calorific value of 99.74 B. t. u, per cubic foot.

Similar calculations on the per cent of inerts present in the theoretical air-gas mixtures for perfect combustion of carburetted water gas, coal gas, coke oven gas, oil gas and natural gas, show the percentage of inerts in the latter gases to be only slightly less than that indicated in the commercial butane-air example above.

From the foregoing it will be understood that the present invention is designed to take advantage of commercial butane or the equivalent thereof as the fuel component of manufactured gas, and in the accompanying drawing, an apparatus is diagrammatically illustrated for the purpose of disclosing the invention in detail.

Referring to the drawing,

The figure is a flow diagram of a suitable apparatus for manufacturing gas from commercial butane and air or the like.

In accordance with the present invention, commercial butane in liquid condition is shipped in tank cars 1, from the point of production, to the gas plant, and each of these tank cars is preferably provided with an eduction pipe 2, extending to the bottom of the car, so that the car may be unloaded into storage at the gas plant by the pressure differential method, thus eliminating the installation and maintenance of pumps.

In case the pressure in the tank car is insufficient to cause the liquid to flow therefrom, it can be increased by any suitable means, such as a small auxiliary gas compressor (not shown). Furthermore, each car may be equipped with coils (not shown), and in event steam or hot water is available, sufficient pressure can be maintained in the car to effectively transfer the liquid by heating the content, as the vapor pressure is a function of the temperature of the liquid.

The eduction pipe or unloading line 2 is provided with suitable hand control valves 3 and 4, and leads into a storage tank 5, which is designed for storage of the commercial butane in liquid condition, and may be provided with relief valves 6, set to open, say at 80 lbs. pressure. It is also preferred to equip this tank with a valve controlled inlet 7, which may be employed to introduce an odorizing agent; for commercial butane has practically no odor.

Instead of passing the liquid butane from the tank car into the storage tank 5, it may be passed directly through a pipe line 8, to a vaporizer 9, or when desired, butanes from the storage tank 5, may be passed through the line 8, to the vaporizer. The line 8 may be equipped with eduction check valves 10 and 11, and is also preferably provided with a strainer 12, and between the strainer and the vaporizer, a liquid regulator 13 is interposed in the pipe line to maintain a constant reduced pressure on the liquid in the vaporizer.

The vaporizer may be constructed similar to a multitubular heat exchanger or condenser, and the water or steam used for heating purposes, may be passed through the tubes of the vaporizer, while the liquid commercial butane will flow in the shell space around the tubes. A small water heater (not shown) will furnish sufficient heat input to vaporize the liquid completely, as the latent heat required per gallon is only 830 B. t. u. The level at which the latent heat must be supplied by the vaporizer may be any suitable temperature in excess of the boiling point of the liquid commercial butane at the vaporizer pressure, and may be as low as 40 or 50° F.

The heating medium may enter the top of the vaporizer through a valved conduit 14, and may be discharged from the bottom of the vaporizer through a valved conduit 15, or vice versa.

The liquid butane enters the vaporizer at the point 16 near the bottom of the vaporizer, and the vaporized butane is discharged near the top of the vaporizer at the point 17, and the vapors flow into a valved conduit 18 which communicates with a conduit 19 that is equipped with a first vapor regulator 20. The vapors leaving the vaporizer are maintained at a constant pressure by said regulator 20, and they flow along the conduit 19, past a manometer or pressure gauge 21, a pop valve 22, and a meter 23, which are interposed in the line 19. The pipe 19 leads the vapors past a second vapor regulator 24, and into a proportioning machine 25, which functions to mix the vapors with a constantly proportionate amount of air or other base gas for diluting purposes.

I usually set this machine so as to produce a gaseous mixture consisting of about 17% commercial butane, and about 83% air or other base gas.

The proportioning machine is provided with a discharge regulator 26 for the finished gas, and is adapted to supply the said regulator with a mixture of any desired calorific value. This machine is so constructed that regulation of the ratio of gas and air can be accomplished by merely turning a valve, and once the machine is set for any definite ratio, it does not require subsequent adjustment.

From the regulator 26, the finished mixture flows through a pipe 27 which is preferably provided at the point 28 with a recording calorimeter, and leads to a surge tank 29. The outlet pipe 30 of the latter is provided with valved branches 31 and 32, and from the line 30, the finished gas is discharged into a low pressure holder (not shown), a high pressure gas storage tank 33, or directly into the gas mains, as the case may be, or as necessity requires.

For accomplishing these purposes, the branch 32 leads to a compressor 34 having a discharge line 35 leading to the storage tank 33, and equipped with suitable control valves as well as a pop valve 36, which may be set to open at 60 lbs. pressure.

The branch 31 is hooked into a gas line 37 which leads to the gas mains by way of a pipe 38 having interposed therein a station meter 39. This meter is not needed unless a measurement of distribution losses is desired. The high pressure storage system provided by the tank 33 is most economical with this method of gas manufacture, unless a low pressure holder is already installed at a particular plant. This high pressure storage need not be used for continuous service, but can carry the off-peak loads, thus obviating the necessity for continuously operating the proportioning machine 25. Moreover, it provides an emergency gas reserve, should electric power fail, or should the proportioning machine or any of the equipment require repairs. In any of these contingencies, the gas can be passed to the mains through a valved pipe 40 which leads to the line 37, and the latter is furnished with a reducing regulator 41, so as to reduce the pressure of the gas to that required in the mains.

The system preferably includes a line 42 which leads from both storage tanks 5 and 33, back to the tank car or liquid storage tank, and is equipped with suitable valves so as to act as a tank car repressure line.

Any vapors formed in the unloading line 3 or storage tank 5, may be led directly through valved pipes 43 and 44 respectively, into a conduit 45, which is also valved and meets the vapor conduit 18 at the point 46, so that the evolved vapors can be passed to the proportioning machine without going through the vaporizer 9.

While one embodiment of the system has been illustrated in the accompanying drawing, it will be apparent to those skilled in the art, that many modifications thereof may be made without departing from the spirit of the invention.

A gaseous fuel consisting of commercial butane and air, has the following advantages:

1. For practical purposes, it is a dehydrated gas, as the only water present is the moisture in the diluent air at atmospheric temperature. If this gas is compressed and stored at high pressure in the tank 33, the small amount of water would be partially condensed. It is feasible to atomize a small amount of oil in the gas, as is done in natural gas installations, to lubricate the interior of the mains.

2. No loss of calorific value occurs in the gas during transmission, as no condensation of the butanes takes place in the lines.

3. No gumming of lines, due to tar and naphthalenes is possible.

4. No purification is required, as commercial butanes contain less than five grains of organic sulphur per 1000 cubic feet of evolved vapor.

It is true that the increased density of the gas will decrease the pipe line capacity, the specific gravity of a 550 B. t. u. butane-air mixture being 1.163. As the pipe line capacity varies the square root of density of one gas over the density of other gas, the amount of two gases of different specific gravities handled by a given distribution system under the same operating conditions would be as the ratios of the square foot of their gravities. If the capacity with reference to a .65 gravity gas is compared, the pipe line capacity of the heavier gas is found to be 74.75%. Offsetting this decreased capacity is the fact that no naphthalene, tar deposits or condensation tending to reduce the pipe line capacity, will occur, and in the case of old used mains, the existing deposits will be gradually picked up and carried with the gas to the point of combustion, and there consumed. Any actual capacity decrease can be cared for by employing slightly higher distribution pressures than those ordinarily used.

This gas can be burned efficiently in practically any standard gas appliance. It is necessary to modify the orifice opening in the burner spud if the burner has been designed for a lighter gas, however, this is the only major adjustment necessary, other than resetting of the burner air shutters, and once made, need not be changed, as exceptional uniformity of the gas with respect to calorific value and specific gravity can be easily maintained.

The chief advantages of this system of manufacture are:

1. Exceptionally low cost of plant installation.
2. Greatly reduced labor cost.
3. Decreased capital charges, maintenance, repairs, etc.
4. Gas of unvarying quality within commercial limits.
5. Profitable operation of small properties where conventional plants have heretofore not been justified.

After a careful study of costs, it seems more economical to employ high pressure gas storage tanks and a gas compressor with a semi-high pressure distribution system than to use a holder and a low pressure system. The cost of the compressor and high pressure storage will not be as great as that of the holder, and the high pressure distribution system cost will be lower on account of the decreased line sizes. It is possible to put gas directly into the service mains from the discharge of the conventional proportioning machine, as long as the distribution pressure is less than about three pounds, at the same time carrying filled high pressure storage tanks as an emergency finished gas reserve.

The system has been disclosed in connection with commercial butane as the fuel component of the finished gas mixture, but it will, of course, be understood that other normally gaseous hydrocarbons may be substituted therefor, but it is ordinarily preferred to use commercial butane as there is an abundance of raw material available from which commercial butane may be inexpensively extracted.

Commercial propane is equally useful as a fuel in the process described, even though it may have a certain disadvantage from the liquid shipping, handling and storage standpoint, on account of the fact that its vapor pressure (about 120 pounds gauge at 70° F.) is considerably higher than that of commercial butane. On the other hand, the use of commercial propane, propane-butane mixtures, or even the more volatile paraffin hydrocarbons, offers substantially lower dew points in finished gas of any certain calorific value, than the dew points obtained when using commercial butane.

While I prefer to employ paraffin hydrocarbons as the fuel element of my gas, it is manifest that I may use normally gaseous hydrocarbons which are not strictly paraffin hydrocarbons, for example, refinery still gases containing propylene, ethylene, unsaturated hydrocarbons, aromatic hydrocarbons, napthenes, etc.

Furthermore, I desire it to be understood that in some cases, the fuel may be passed from the tank car or storage tank 1, to the proportioning machine 25, without using the vaporizer. In such a case, a heating coil in the tank car or storage tank, can furnish the heat of vaporization, or in the case of propane or other relatively volatile hydrocarbons, latent heat will flow into the tank from the surrounding atmosphere, and will thus cause vaporization.

From the foregoing it is believed that the construction of the apparatus, steps of the process, and the advantages of the system may be readily understood by those skilled in the art.

What is claimed and desired to be secured by Letters Patent is:

1. Apparatus for producing gaseous mixtures, comprising means for storing a fuel gas in liquefied condition, a vaporizer, a conduit for leading liquefied fuel gas to the vaporizer from said storage means, a proportioning machine for mixing the fuel with a base gas, a second conduit for leading the fuel gas from the vaporizer to the proportioning machine, pressure regulators interposed in said conduits for governing the pressure of the fuel gas entering and leaving the vaporizer, and a vapor conduit leading from the storage means to the second conduit for discharging fuel gas vapor directly into the second conduit between the vaporizer and proportioning machine.

2. An apparatus for producing gaseous mixtures, comprising a first pressure tank for use in transporting liquefied petroleum gas, a second pressure storage tank for storing said gas in liquefied condition, a conduit leading from the bottom of the first tank to the second tank for transferring the gas in liquefied condition from the first to the second tank, means for vaporizing liquefied gas from either of said tanks, means for proportioning the vaporized gas and a base gas and for mixing the same, a third pressure storage tank for the mixture, means for compressing the mixture and for introducing the same into the third tank under pressure, and valve controlled conduits placing the second and third tanks in communication with the first tank for leading pressure gases from the second and third tanks into the first tank.

3. An apparatus for producing gaseous mixtures, comprising a pressure storage chamber adapted to contain liquefied gas, a vaporizer for completely vaporizing said gas, a conduit for leading liquefied gas from the storage chamber to the vaporizer, an automatic proportioning machine for proportioning air and gas at a constant ratio, a conduit for leading all of the vapors from the vaporizer to the proportioning machine, a vapor regulator interposed in the last mentioned conduit for maintaining the pressure of the vapors substantially constant, means forming part of the proportioning machine for mixing the vapors with air, and means for discharging the mixture from the proportioning machine.

4. An apparatus for producing gaseous mixtures, comprising a pressure storage chamber adapted to contain a liquefied petroleum gas, a vaporizer, a conduit leading from the storage chamber to the vaporizer, an automatic proportioning machine for proportioning a base gas and the first mentioned gas at a constant ratio, a conduit for leading all of the vapors from the vaporizer to the proportioning machine, a vapor regulator interposed in the last mentioned conduit, means forming part of the proportioning machine for mixing the vapors with a base gas, means for discharging the mixture from the proportioning machine, a compressor receiving the mixture from the last mentioned means, and a storage tank communicating with the discharge line of the compressor.

ROSSWELL W. THOMAS.